(12) United States Patent
Sawchuk et al.

(10) Patent No.: US 9,297,489 B2
(45) Date of Patent: Mar. 29, 2016

(54) EXTENDED LENGTH FLOW CONDITIONER

(71) Applicant: Canada Pipeline Accessories, Co. Ltd., Calgary (CA)

(72) Inventors: Daniel A. Sawchuk, Chestermere (CA); Reginald Selirio, Calgary (CA)

(73) Assignee: Canada Pipeline Accessories, Co. Ltd., Calgary (CA)

( * ) Notice: Subject to any disclaimer, the term of this patent is extended or adjusted under 35 U.S.C. 154(b) by 126 days.

(21) Appl. No.: 14/152,459

(22) Filed: Jan. 10, 2014

(65) Prior Publication Data

US 2014/0196535 A1 Jul. 17, 2014

Related U.S. Application Data

(60) Provisional application No. 61/753,512, filed on Jan. 17, 2013.

(51) Int. Cl.
| | |
|---|---|
| *G01F 3/12* | (2006.01) |
| *G01F 15/00* | (2006.01) |
| *G01F 15/06* | (2006.01) |
| *F16L 55/027* | (2006.01) |
| *F15D 1/02* | (2006.01) |

(52) U.S. Cl.
CPC ........... *F16L 55/02718* (2013.01); *F15D 1/025* (2013.01); *F16L 55/02763* (2013.01); *G01F 15/00* (2013.01)

(58) Field of Classification Search
CPC ........ F15D 1/0005; F15D 1/0015; G01F 1/00
USPC ............................................... 138/40, 46, 44
See application file for complete search history.

(56) References Cited

U.S. PATENT DOCUMENTS

| | | |
|---|---|---|
| D198,356 S | 6/1964 | Wahlin et al. |
| D200,088 S | 1/1965 | Earnshaw |
| 3,232,550 A | 2/1966 | Cuva |
| 5,341,848 A | 8/1994 | Laws |
| 5,495,872 A | 3/1996 | Gallagher et al. |
| 5,606,297 A | 2/1997 | Phillips |
| 5,762,107 A | 6/1998 | Laws |
| 5,959,216 A | 9/1999 | Hocquet et al. |
| 6,807,986 B2 | 10/2004 | Boger |
| 7,073,534 B2 | 7/2006 | Sawchuk et al. |
| 7,089,963 B2 * | 8/2006 | Meheen ........................ 138/44 |

(Continued)

FOREIGN PATENT DOCUMENTS

| | | |
|---|---|---|
| CA | 2171828 | 3/1995 |
| CA | 2228928 | 8/1995 |

(Continued)

OTHER PUBLICATIONS

Various authors, Title: 2003 Proceedings, 38th Annual American School of Gas Measurement Technology, Date: Sep. 2003, Publisher: American School of Gas Measurement Technology, Total pp. 390.*

*Primary Examiner* — Lisa Caputo
*Assistant Examiner* — Roger Hernandez-Prewitt
(74) *Attorney, Agent, or Firm* — Cahn & Samuels, LLP

(57) ABSTRACT

A flow conditioner includes 1) a single disk comprising an array of holes and having an outer ring of holes, and 2) a section extending longitudinally from an outer circumference of the disk and comprising bores that at least partially follow the contour or pattern of the outer ring of holes.

10 Claims, 4 Drawing Sheets

(56) References Cited

U.S. PATENT DOCUMENTS

| | | |
|---|---|---|
| D577,100 S | 9/2008 | Brown et al. |
| D577,101 S | 9/2008 | Kong et al. |
| 7,464,611 B2 * | 12/2008 | Matter et al. ............... 73/861.52 |
| 7,845,688 B2 | 12/2010 | Gallagher et al. |
| 8,132,961 B1 | 3/2012 | England et al. |
| D674,878 S | 1/2013 | Jones et al. |
| D682,987 S | 5/2013 | Blum |
| D697,581 S | 1/2014 | Sawchuk et al. |
| D701,939 S | 4/2014 | Sawchuk et al. |
| D721,417 S | 1/2015 | Sawchuk et al. |
| 2004/0055816 A1 | 3/2004 | Gallagher et al. |
| 2005/0178455 A1 | 8/2005 | Cancade et al. |
| 2008/0246277 A1 | 10/2008 | Gallagher et al. |
| 2011/0174407 A1 | 7/2011 | Lundberg et al. |
| 2011/0174408 A1 | 7/2011 | Lundberg et al. |
| 2012/0247223 A1 | 10/2012 | Sawchuk et al. |

FOREIGN PATENT DOCUMENTS

| | | |
|---|---|---|
| CA | 2787659 | 7/2011 |
| GB | 1469648 A | 4/1977 |
| WO | 2014040191 A1 | 3/2014 |
| WO | 2014110673 A1 | 7/2014 |
| WO | 2014186883 A1 | 11/2014 |

* cited by examiner

EXTENDED LENGTH FLOW CONDITIONER

This application claims priority to U.S. provisional patent application Ser. No. 61/753,512 filed in the U.S. Patent and Trademark Office on Jan. 17, 2013, the entirety of which is incorporated herein by reference.

FIELD OF THE INVENTION

The present invention relates to fluid flow measurement components used in oil and gas pipelines. More particularly, the present invention relates to a flow conditioner having an extended length around an outer set of holes or apertures.

BACKGROUND OF THE INVENTION

Pipelines are used to transport fluids in various industries, including chemical, oil and gas, and manufacturing. These industries use processes that require fluid flow rates to be accurately measured. These measurements are performed at locations known as meter stations using a variety of different meter types. These meters function in different ways, they can use: differential pressure of the fluid across an obstruction, ultrasonic signal travel times, turbine blade rotational speed, Coriolis forces, or even electrical and magnetic fields being generated due to bulk fluid movement. Almost all of these measurement methods require use of the fluid velocity distribution, known as a velocity flow profile.

To achieve the most accurate measurements, the flow profile of the fluid entering a metering device must be stable, non-rotating, and symmetric. This type of velocity distribution is known as a fully developed flow profile, and it forms naturally in very long lengths of uninterrupted straight pipe. However, having long lengths of straight pipe is impractical and cost prohibitive. As a result, meter station piping often contains elbows, tees, valves and other assemblies that distort the flow profile into an asymmetric, unstable, and distorted configuration. This makes it very difficult to measure the fluid flow rate in a consistently accurate and repeatable manner. Under these conditions, flow conditioners are needed to correct the flow profile of the fluid such that it forms a fully developed flow profile which allows accurate, repeatable measurements to be made.

Several types of flow conditioners exist, including straightening vanes, tube bundles, and perforated plates. These flow conditioners are placed within the pipe upstream of the flow meter. A typical perforated plate flow conditioner consists of a perforated metal plate that is arranged within a pipe orthogonal to the fluid flow, i.e., across the entire cross section of pipe. The perforations or holes in the flow conditioner cause the fluid flow to be redistributed such that it forms a fully developed flow profile. The placement of a flow conditioner upstream of the flow meter ensures that the flow is fully developed before it reaches the meter. This allows the meter to perform significantly more accurate and repeatable fluid flow measurements.

There remains a need for a flow conditioner that stays tight in a pipe and which may be installed, for example via a pinned method, where a flange-based installation cannot be used.

SUMMARY OF THE INVENTION

The present invention, in at least one embodiment, provides a flow conditioner including 1) a single disk having an array of holes including an outer ring of holes, and 2) a section extending longitudinally from an outer circumference of the disk and comprising bores that at least partially follow the contour or pattern of the outer ring of holes.

The present invention, in at least another embodiment, provides a pipe assembly for flow measurement including a fluid flow pipe; a flow conditioner disposed within the fluid flow pipe in an orientation substantially perpendicular to an axis of the fluid flow pipe and comprising 1) a single disk having an array of holes including an outer ring of holes and 2) a section extending longitudinally from an outer circumference of the disk and comprising bores that at least partially follow the contour or pattern of the outer ring of holes.

The present invention, in yet another embodiment, provides a fluid flow measurement system including a fluid flow pipe; a flow conditioner disposed within the fluid flow pipe in an orientation substantially perpendicular to an axis of the fluid flow pipe and comprising 1) a single disk having an array of holes including an outer ring of holes and 2) a section extending longitudinally from an outer circumference of the disk and comprising bores that at least partially follow the contour or pattern of the outer ring of holes; and a flow meter.

An advantage of the flow conditioner according to the present invention is that it minimizes or eliminates swirl and provides a fully developed velocity flow profile.

Another advantage of the flow conditioner according to the present invention is that it stays tight in a pipe, thereby substantially minimizing or preventing any rotating or rocking that could cause an installation pin to dislodge.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Figure 1:
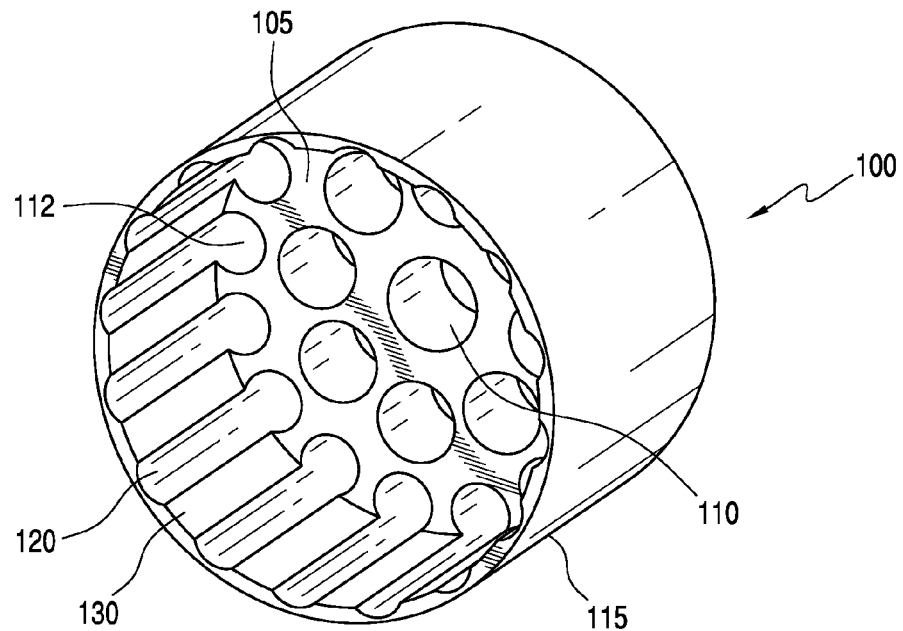
FIG. 1 illustrates a perspective view of a flow conditioner having an extended section on a first side extending longitudinally from an outer circumference of a disk having an array of holes.
Figure 2:
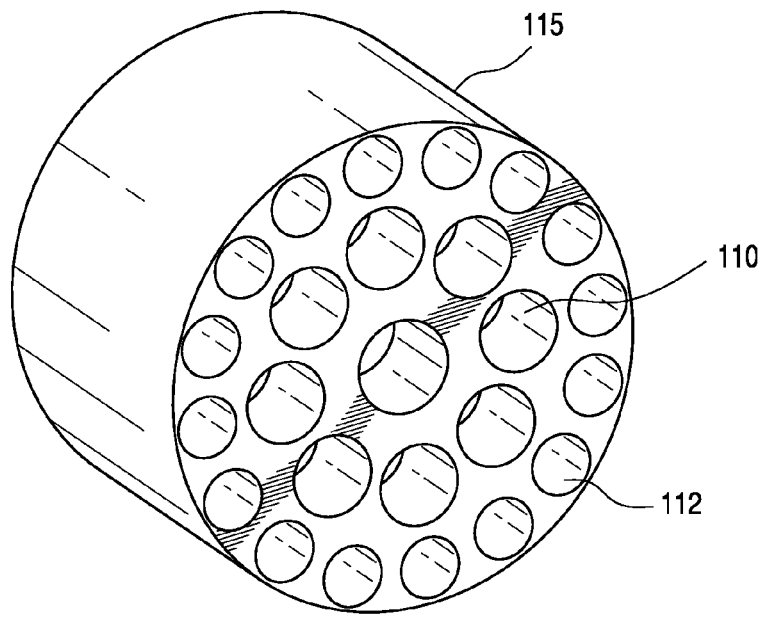
FIG. 2 illustrates a perspective view from a second side of a flow conditioner of FIG. 1.

Given the following enabling description of the drawings, the methods and systems should become evident to a person of ordinary skill in the art.

DETAILED DESCRIPTION OF THE INVENTION

As shown in FIGS. 1-8, a flow conditioner 100 according to the present invention comprises a single disk 105 comprising an array of holes 110 and having an outer ring of holes 112. A section 115 extends longitudinally from an outer circumference of the disk and comprises bores 120 that at least partially follow the contour or pattern of the outer ring of holes 112, that is, a portion of an outer ring of holes or apertures is bored along the extended section.

Figures 3, 4:
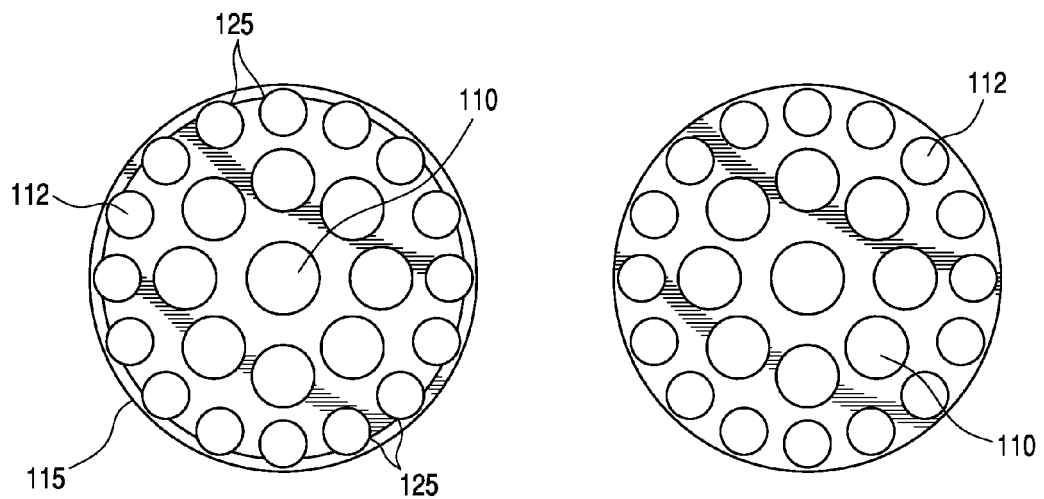
FIG. 3 illustrates a front view of the flow conditioner of FIG. 1.
FIG. 4 illustrates a rear view of the flow conditioner of FIG. 1.
Figure 5:
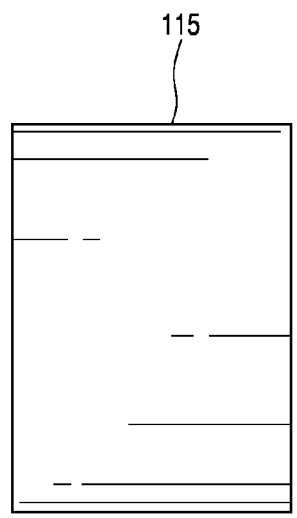
FIG. 5 illustrates a side view of the flow conditioner of FIG. 1.
Figure 6:
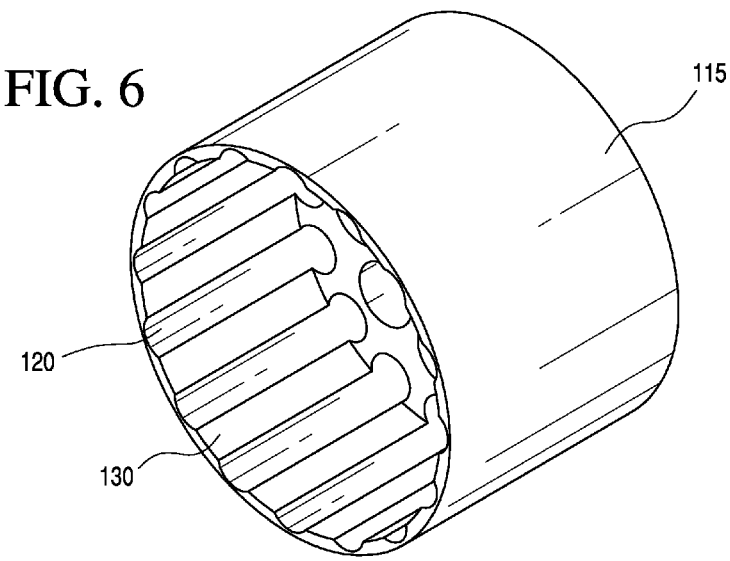
FIG. 6 illustrates another perspective view of a flow conditioner according to an embodiment of the present invention.
Figure 7:
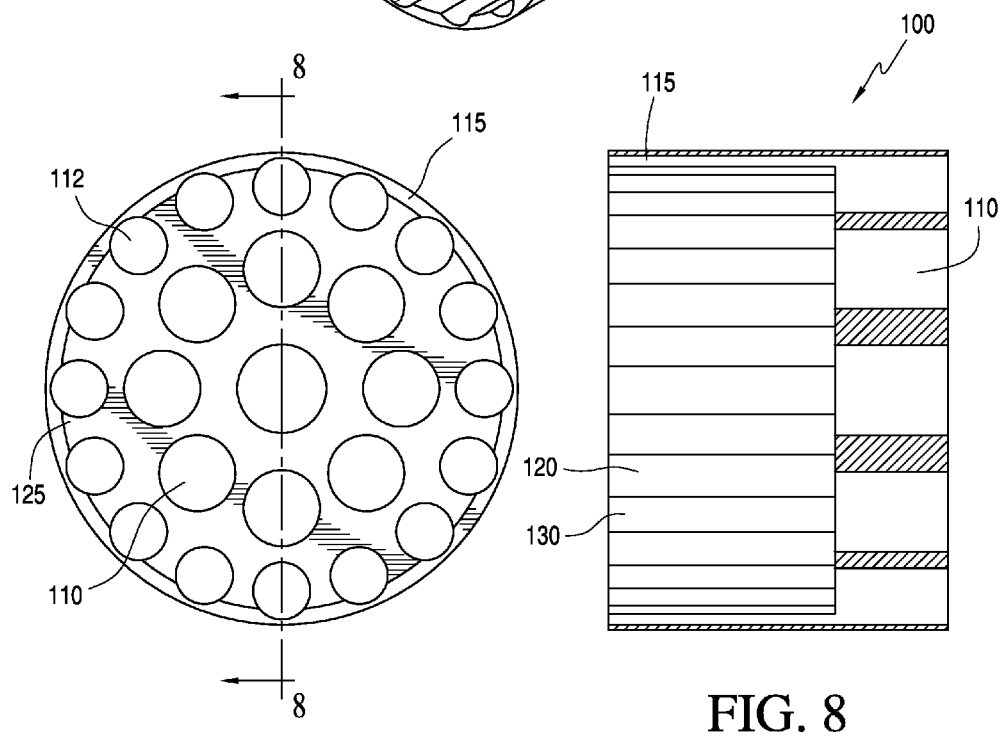
FIG. 7 illustrates a front view of the flow conditioner of FIG. 6.
Figure 8:
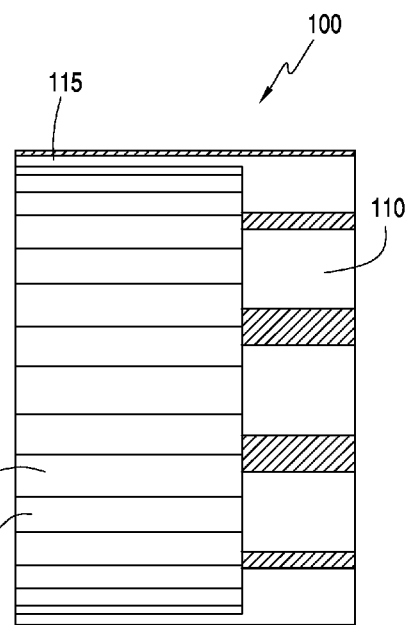
FIG. 8 illustrates a side cross-sectional view of the flow conditioner of FIG. 6.

Thus, the extended section 115 comprises a plurality of bores 120, each bore 120 extending from an outer hole and at least partially following a circumference of the outer hole. Between the holes of the outer ring of holes 112, along a surface of the disk 105, there are opposing sharp or pointed corners 125 (FIG. 3 and FIG. 7). Flat sections 130 extend longitudinally along the extended section 115 between bores 120, as illustrated in FIG. 1 and FIG. 6.

The flow conditioner may be installed in any pipe having inside diameter (D). In specific embodiments, an inside diameter of the pipe and thus of the flow conditioner may be about 1 to about 6 inches, for example, about 2 to about 4 inches. In specific embodiments, section 115 may have a length of about 0.15 D to about 2 D.

In a specific embodiment, the flow conditioner according to the present invention may be used upstream of a flow meter having a beta ratio (i.e., size of orifice opening/inside diameter of pipe) of up to about 0.75 (for example, 0.25, 0.5, or 0.75) and remain AGA3-2000 (American Gas Association) compliant. This embodiment may require a minimum meter run size of 13 D (inside pipe diameter) with 8 D between the flow conditioner and the flow meter and a minimum of 5 D upstream of the flow conditioner.

Disks configurations for the flow conditioner of the present invention may include, but are not limited to, CPA TBR and CPA 50E flow conditioners available from Canada Pipeline Accessories of Calgary, Alberta Canada; and the flow conditioners described in U.S. Pat. No. 5,341,848, which is herein incorporated by reference in its entirety.

According to the present invention, a pipe assembly for flow measurement may comprise a fluid flow pipe; and a flow conditioner of the present invention disposed within said fluid flow pipe in an orientation substantially perpendicular to an axis of said fluid flow pipe. The flow conditioner may be utilized in a forward or backward configuration depending upon the pipe environment.

According to the present invention, a fluid flow measurement system may comprise a fluid flow pipe; a flow conditioner according to the present invention disposed within the fluid flow pipe in an orientation substantially perpendicular to an axis of said fluid flow pipe; and a flow meter downstream of the flow conditioner.

Figure 9:
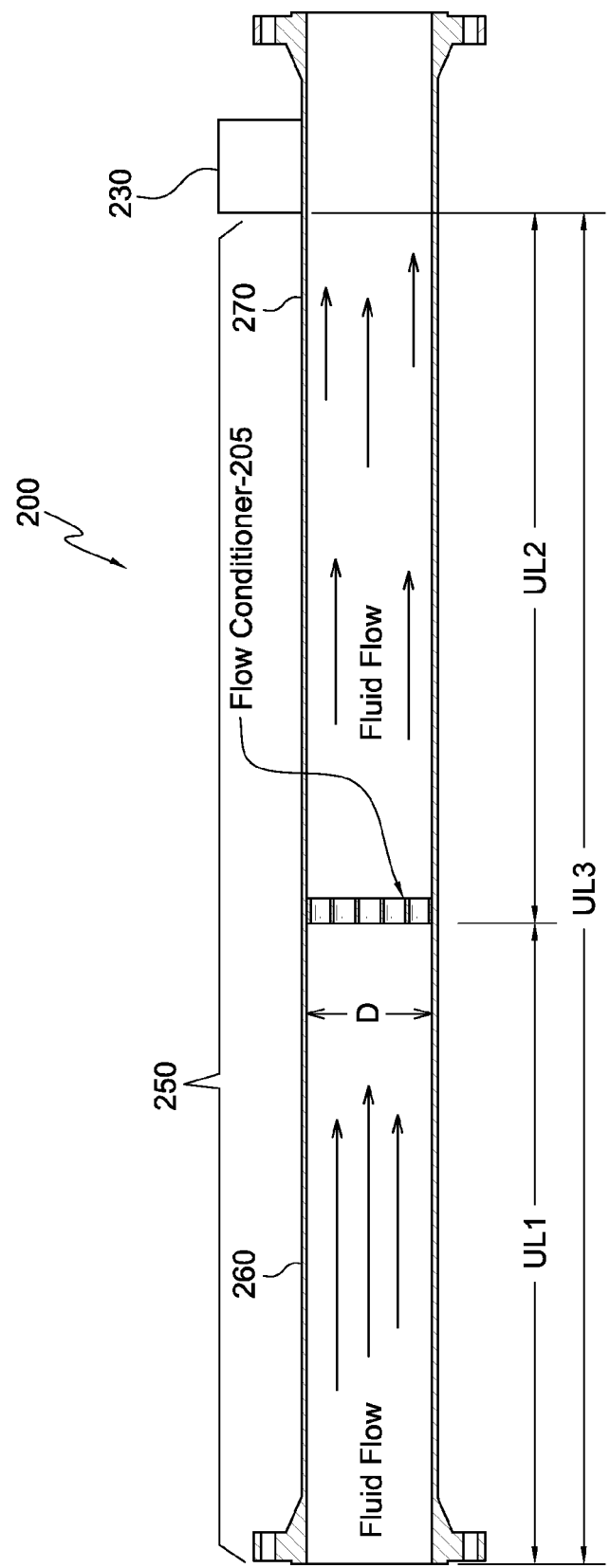
FIG. 9 schematically illustrates a flow measurement system including a flow conditioner in accordance with the present invention.

FIG. 9 illustrates a flow measurement system 200 including a pipe assembly 250 and a flow meter 230 connected to the downstream end portion of the pipe assembly. Pipe assembly 250 includes one or more sections of pipe (UL1, UL2) and a flow conditioner 205 attached to the one or more sections of pipe.

In one embodiment, pipe assembly 250 includes a first section 260 and a second section 270 where flow conditioner 205 is disposed between the first section 260 and second section 270 so as to be downstream from section 260 and upstream from section 270 and flow meter 230. The first section has a pipe length UL1 and the second section has a pipe length UL2. Length UL1 defines a length of straight pipe disposed immediately upstream of the flow conditioner. Length UL2 defines a length of pipe measured from the flow conditioner to the flow meter. These lengths may be determined through experimental testing, and are set at the minimum length needed to recreate a fully developed flow profile. The total length of pipe encompassing UL1, the flow conditioner, UL2, the meter, and a downstream pipe spool is known as a meter run.

The flow conditioner according to the present invention may be utilized in existing piping without making modifications. In specific embodiments, the flow conditioner may be installed via a pinned method.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A flow conditioner, comprising:
    a single disk comprising an array of holes and having an outer ring of holes;
    a section extending longitudinally from an outer circumference of the disk and comprising a plurality of bores, each bore extending from an outer hole and partially following a circumference of the outer hole; and
    flat sections extending longitudinally between bores and along said section extending longitudinally.

2. A flow conditioner according to claim 1, wherein a portion of an outer ring of holes is bored along the section.

3. A flow conditioner according to claim 1, where the flow conditioner is a single integral piece.

4. A flow conditioner according to claim 1, wherein between holes of the outer ring of holes, along a surface of the disk, there are opposing sharp or pointed corners.

5. A flow conditioner according to claim 1, wherein a length of the section extending longitudinally is about 0.15 D to about 2 D, wherein D is the inside pipe diameter of the pipe in which the flow conditioner is installed.

6. A pipe assembly for flow measurement, comprising:
    a fluid flow pipe;
    a flow conditioner disposed within said fluid flow pipe in an orientation substantially perpendicular to an axis of said fluid flow pipe,
    said flow conditioner comprising:
    a single disk comprising an array of holes and having an outer ring of holes, and
    a section extending longitudinally from an outer circumference of the disk and comprising a plurality of bores, each bore extending from an outer hole and partially following a circumference of the outer hole; and
    flat sections extending longitudinally between bores and along said section extending longitudinally.

7. A pipe assembly according to claim 6, wherein said fluid flow pipe has an inside diameter of 1 to 6 inches.

8. A fluid flow measurement system, comprising:
a fluid flow pipe;
a flow conditioner disposed within said fluid flow pipe in an orientation substantially perpendicular to an axis of said fluid flow pipe; and
a flow meter downstream of the flow conditioner,
said flow conditioner comprising:
a single disk comprising an array of holes and having an outer ring of holes, and
a section extending longitudinally from an outer circumference of the disk and comprising a plurality of bores, each bore extending from an outer hole and partially following a circumference of the outer hole; and
flat sections extending longitudinally between bores and along said section extending longitudinally.

9. A fluid flow measurement system according to claim 8, wherein the fluid flow pipe has an inside diameter D, and wherein there is 8 D between the flow conditioner and the flow meter and a minimum of 5 D upstream of the flow conditioner.

10. A flow conditioner, comprising:
a single disk comprising an array of holes and having an outer ring of holes;
a section extending longitudinally from an outer circumference of the disk and comprising a plurality of bores that partially follow a contour or pattern of the outer ring of holes; and
flat sections extending longitudinally between bores and along said section extending longitudinally.

* * * * *